(12) United States Patent
Xu et al.

(10) Patent No.: US 11,570,477 B2
(45) Date of Patent: Jan. 31, 2023

(54) DATA PREPROCESSING AND DATA AUGMENTATION IN FREQUENCY DOMAIN

(71) Applicant: Alibaba Group Holding Limited, Grand Cayman (KY)

(72) Inventors: Kai Xu, Hangzhou (CN); Fei Sun, San Jose, CA (US); Minghai Qin, Sunnyvale, CA (US); Yen-kuang Chen, Palo Alto, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 382 days.

(21) Appl. No.: 16/731,954

(22) Filed: Dec. 31, 2019

(65) Prior Publication Data
US 2021/0203992 A1 Jul. 1, 2021

(51) Int. Cl.
*G06V 20/00* (2022.01)
*H04N 19/625* (2014.01)
*H04N 19/44* (2014.01)

(52) U.S. Cl.
CPC ........... *H04N 19/625* (2014.11); *H04N 19/44* (2014.11)

(58) Field of Classification Search
CPC ...... G06K 9/00228; G06K 9/522; H04N 7/50; H04N 7/26244; H04N 7/30; H04N 7/26335; H04N 7/26271; H04N 1/3935; H04N 1/393; G06T 5/006; G06T 5/20; G06T 5/001; G06T 11/60; G06T 11/001; G06T 3/00; G06T 3/40; G06T 3/60; G06T 3/4007; G06T 3/4023; G06T 1/60; G06F 17/148; G02B 27/0002; G02B 27/46

See application file for complete search history.

(56) References Cited

U.S. PATENT DOCUMENTS

| 6,304,271 | B1 | 10/2001 | Nehme |
| 2003/0234798 | A1 | 12/2003 | Ratnakar |
| 2005/0010395 | A1* | 1/2005 | Chiu .................... G10L 19/035 704/E19.044 |

(Continued)

OTHER PUBLICATIONS

PCT Search Report and Written Opinion dated Mar. 9, 2021 for PCT Application No. PCT/US20/65328, 13 pages.

*Primary Examiner* — Amir Alavi
(74) *Attorney, Agent, or Firm* — Lee & Hayes, P.C.

(57) ABSTRACT

Methods and systems are provided for implementing preprocessing operations and augmentation operations upon image datasets transformed to frequency domain representations, including decoding images of an image dataset to generate a frequency domain representation of the image dataset; performing a resizing operation based on resizing factors on the image dataset in a frequency domain representation; performing a reshaping operation based on reshaping factors on the image dataset in a frequency domain representation; and performing a cropping operation on the image dataset in a frequency domain representation. The methods and systems may further include performing an augmentation operation on the image dataset in a frequency domain representation. Methods and systems of the present disclosure may free learning models from computational overhead caused by transforming image datasets into frequency domain representations. Furthermore, computational overhead caused by inverse transformation operations is also alleviated.

20 Claims, 6 Drawing Sheets

(56) References Cited

U.S. PATENT DOCUMENTS

| | | | |
|---|---|---|---|
| 2005/0286775 A1* | 12/2005 | Jeffrey | G06T 1/60 |
| | | | 382/232 |
| 2006/0022987 A1* | 2/2006 | Rai | G06T 1/60 |
| | | | 345/571 |
| 2006/0176376 A1 | 8/2006 | Dyke et al. | |
| 2010/0027663 A1* | 2/2010 | Dai | H04N 19/48 |
| | | | 375/E7.123 |
| 2012/0201476 A1* | 8/2012 | Carmel | H04N 19/50 |
| | | | 382/239 |
| 2012/0263392 A1 | 10/2012 | Wang et al. | |
| 2014/0064631 A1 | 3/2014 | Gaubatz et al. | |
| 2020/0288158 A1* | 9/2020 | Rusanovskyy | H04N 19/176 |
| 2020/0288159 A1* | 9/2020 | Van der Auwera | H04N 19/105 |
| 2021/0092415 A1* | 3/2021 | Keating | H04N 19/18 |
| 2021/0201538 A1* | 7/2021 | Xu | G06N 20/00 |
| 2021/0203992 A1* | 7/2021 | Xu | G06T 9/002 |
| 2022/0070484 A1* | 3/2022 | Zhao | H04N 19/176 |

* cited by examiner

DATA PREPROCESSING AND DATA AUGMENTATION IN FREQUENCY DOMAIN

BACKGROUND

Many forms of information, such as audio and images, may be transformed into various representations thereof in the frequency domain, then transformed back to their original representation by an inverse transformation. A frequency domain representation of information has numerous applications in data processing. For example, image encoding algorithms generally compress image data by transforming image data into a frequency domain representation, as reduction of image data size can be readily accomplished by algorithms operating on frequency domain data.

In machine learning settings utilizing image-based learning models, training and inference datasets may be ready-made datasets of compressed images, but may alternatively be raw, uncompressed images captured by an image capture device such as a camera. In a system implemented for machine learning computation on massive datasets, computational resources may be distributed over a network in, for example, a cloud computing system to maximize power and availability. As uncompressed images are untenable for transportation over a network and training and inference computation, machine learning systems configured in this manner also rely on transformation and inverse transformation of images into and out of the frequency domain in order to compress image datasets for optimal transport, storage, and computation.

The transformation of image datasets into the frequency domain in the machine learning context is generally helpful in determining contextual information such as relative importance of image data, by the application of principles derived from, for example, frequency-based filtering. However, presently, no pipeline exists between coding of representations of images in the frequency domain and derivation of representations of images in the frequency domain for training and inference computations. Greater computational efficiency may be realized by leveraging image coding in the frequency domain for further applications in machine learning.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to implementing data preprocessing and data augmentation for learning models, and more specifically performing data preprocessing and data augmentation on image datasets for model training after a transformation thereof into the frequency domain and before an inverse transformation thereof.

A learning model, according to example embodiments of the present disclosure, may be a defined computation algorithm executable by one or more processors of a computing system to perform tasks that include processing input having various parameters and outputting results. A learning model may be, for example, a layered model such as a deep neural network, which may have a fully-connected structure, may have a feedforward structure such as a convolutional neural network (CNN), may have a backpropagation structure such as a recurrent neural network (RNN), or may have other architectures suited to the computation of particular tasks. Tasks may include, for example, classification, clustering, matching, regression, and the like.

Tasks may provide output for the performance of functions such as recognizing entities in images and/or video; tracking movement of entities in video frames in real-time; matching recognized entities in images and/or video to other images and/or video; providing annotations or transcriptions of images, video, and/or audio in real-time; and the like.

Cloud computing systems may provide collections of servers hosting computing resources to provide distributed computing, parallel computing, improved availability of physical or virtual computing resources, and such benefits. Data centers implemented in cloud computing systems may host learning models to provide these benefits for the application of computing using learning models.

A cloud computing system may connect to various end devices which collect data to be input into learning models to train the learning models and/or in association with various tasks for the computation and output of results required for the performance of those tasks. End devices may connect to the cloud computing system through edge nodes of the cloud computing system. An edge node may be any server providing an outbound connection from connections to other nodes of the cloud computing system, and thus may demarcate a logical edge, and not necessarily a physical edge, of a network of the cloud computing system. Moreover, an edge node may be edge-based logical nodes that deploy non-centralized computing resources the cloud computing system, such as cloudlets, fog nodes, and the like.

End devices may be responsible for multiple types of task involving multiple types of input data. For example, an end device may be a security camera which collects still images, video, and other types of data, connects to an edge node of a cloud computing system which performs real-time security monitoring of locations being surveilled by such security cameras, and sends each of these types of data in real-time to the cloud computing system to perform various tasks related to real-time security monitoring. According to another example, an end device may be a smart vehicle in motion which collects still images, video, and other types of data during motion, connects to roadside networking infrastructure which serves as an edge node of a cloud computing system which performs real-time traffic monitoring of smart vehicles, and sends each of these types of data in real-time to the cloud computing system to perform various tasks related to real-time traffic monitoring.

These different types of input may each require computing by learning models. Due to the very large file sizes of image datasets used in deep learning, loading and computation of image datasets may incur substantial computational overhead.

In an IoT network connected to a cloud computing system, massive numbers of tasks and collections of data associated therewith may be delivered from edge devices to the cloud computing system for processing. Edge devices of the IoT network may be geographically remote from the computational resources of the cloud computing system, resulting in network latency in the transportation of tasks and associated data. The relatively lower computing resource specifications of edge devices compared to the cloud computing system, including processing power, storage, and memory, also results in a relative disparity in computational capacity therebetween. Various architectural designs may be implemented over the learning model in order to address network latency and disparity in computational capacity so as to improve response time and efficiency in completing tasks.

For example, massive quantities of locally collected data at edge devices may result in intolerable degrees of latency if delivered to a cloud computing system for computing by a learning model executing on the cloud computing system. Moreover, images in a raw, uncompressed format are highly inefficient for machine learning computation due to containing many times more data, often superfluous for machine learning training and inference purposes, than compressed images. Consequently, it is desirable to compress images captured at image capture devices prior to the use of such images in training and inference datasets.

It is generally known to transform data into a frequency representation by a transform algorithm such as, for example, Fourier transform, and to transform image data from a spatial domain representation (i.e., image pixel data) into a frequency domain representation by Fourier-related algorithms such as discrete cosine transform ("DCT"). The inverse discrete cosine transform ("IDCT") may further operate to return a frequency domain representation of image data to a spatial domain representation. Common image compression formats such as JPEG utilize DCT to transform raw images into a frequency domain representation and discard image data selectively by frequency. DCT-based image encoders save images in a compressed format which cannot be utilized for computation until decoded into reconstructed images. However, reconstructed images remain represented in the frequency domain and must undergo IDCT to be returned to a spatial domain representation.

Presently, model training and inference are implemented assuming that image datasets are input into learning models in spatial domain representations thereof. Additionally, prior to their input into learning models, image datasets may be modified through processes broadly referred to as preprocessing and augmentation. Preprocessing of an image dataset may refer to any type of operation performed on data of the dataset images to modify the images in manners desired for particular needs of model training and/or inference (such as conforming the images to dimensions required by a learning model for input images)). For example, images may be transformed into different color spaces; may be resized, reshaped, cropped (at a fixed position on the image such as a center position or a particular corner position), centered, and normalized, or may undergo other such operations as known to persons skilled in the art. Augmentation of an image dataset may refer to any type of operation performed on data of the dataset images to generate additional images in the image dataset. For example, images may be resized, rotated, reshaped, cropped (at random positions on an original image, any number of times), rescaled in any or all color channels thereof, shifted by some number of pixels in any direction, altered in brightness or contrast, or flipped in any orientation, or may undergo other such operations as known to persons skilled in the art.

As a result, in the event that image datasets originate in a raw, uncompressed format, substantial computational overhead is incurred from performing first DCT and then IDCT on the entire dataset during the compression of images of the image dataset. Even if image datasets originate in a compressed format, the application of preprocessing and augmentation operations on these compressed images requires the compressed images to be decoded and transformed into decompressed spatial domain representations thereof. Given that augmentation has the objective of generating additional images from each input image, computational overhead of these operations may increase with the number of input images, a number of output images desired, and the size of each image in pixels.

Example embodiments of the present disclosure provide training of learning models using image datasets transformed into frequency domain representations. Furthermore, to facilitate such training, example embodiments of the present disclosure provide preprocessing of frequency domain representations of image datasets, and augmentation of frequency domain representations of image datasets. Thus, example embodiments of the present disclosure may enable preprocessing and augmentation of image datasets to be performed upon frequency domain representations of images without performance of IDCT thereupon by a decoder and without conversion into spatial domain representations thereof, thereby simplifying computational complexity of learning and inference computations at learning models, allowing learning models to more directly and efficiently evaluate relative importance of image data using information accessible in the frequency domain but not readily determined in the spatial domain.

Figure 1A:
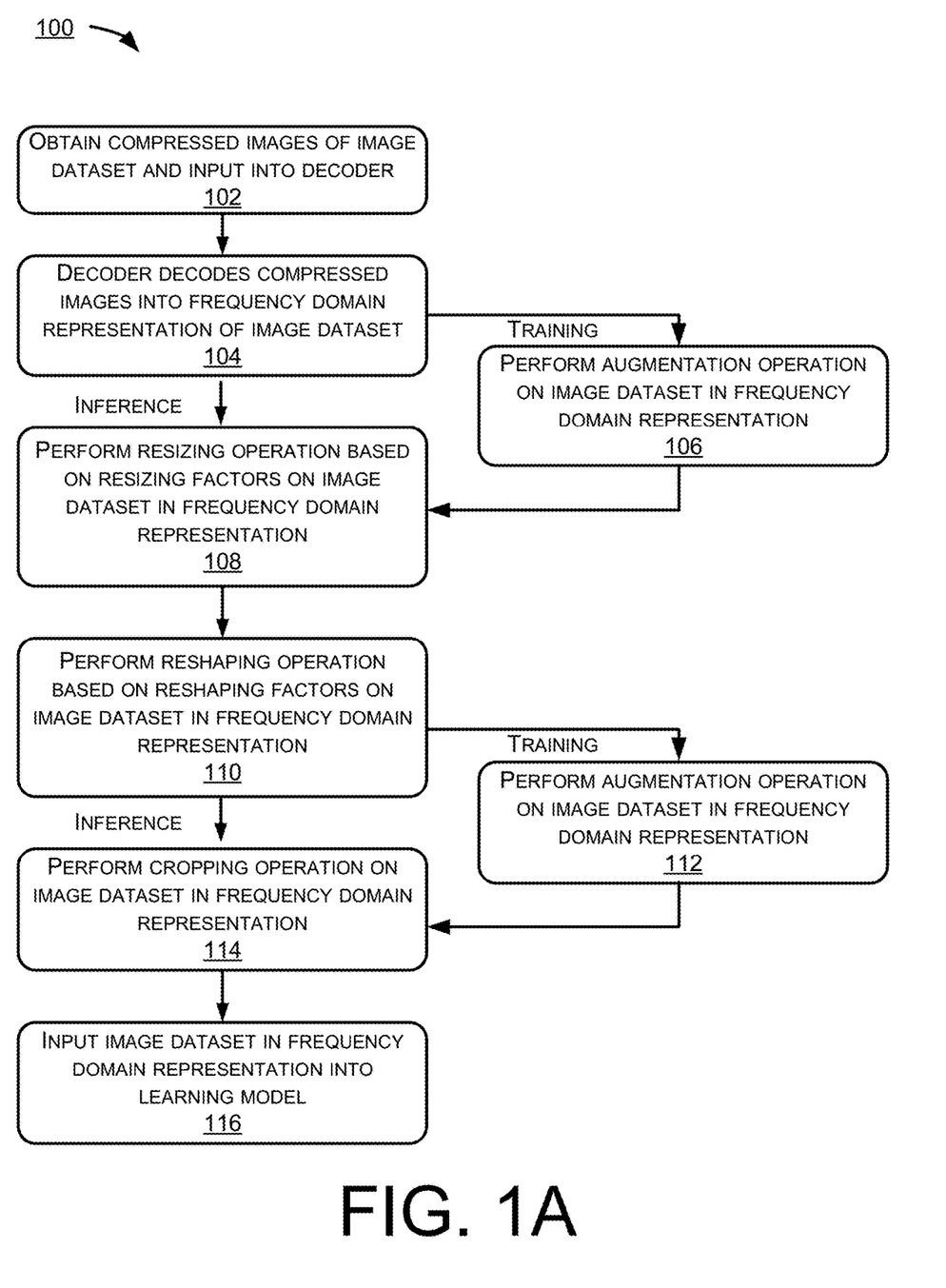
FIG. 1A illustrates a flowchart of a preprocessing and augmentation process for image datasets to be input into a learning model for training and inference according to example embodiments of the present disclosure.

FIG. 1A illustrates a flowchart of a preprocessing and augmentation process for image datasets to be input into a learning model for training and inference according to example embodiments of the present disclosure.

Prior to steps of the process 100, the images of the image dataset may have been captured by an image capture device in a raw image format. The image capture device may be, for example, a security camera or a camera of a smart vehicle. The image capture device may capture images making up an image dataset in the form of still images or video. The image capture device may further encode captured images into a compressed format by an encoding mode of a codec which transforms captured images into frequency domain representations thereof.

According to example embodiments of the present disclosure, image capture devices may be connected by a data bus connection, optical data connection, or other connection suitable for transmission of images with a computing device operative to perform image decoding, preprocessing and augmentation operations, or may be connected by a wired or wireless network connection with such a computing device. For example, a computing device may be a personal computing system, a cluster of computing systems, a server of a cloud computing system such as an edge server, an embedded computing system of a smart device such as a vehicle or appliance, and the like. Examples of computing devices according to example embodiments of the present disclosure may further be operative to perform subsequent training and inference computations using the image dataset, depending on respective computing capacity. In example embodiments of the present disclosure where a computing device is not operative to perform training and inference computations, the computing device may further be connected by suitable connections, such as wired or wireless network connections, to additional computing devices operative to perform training and inference computations. In any case, at least each step of the process 100 may be performed by a computing device as described herein.

Alternatively, according to other example embodiments of the present disclosure, images of image datasets may originate from one or more precompiled image datasets rather than raw images captured by an image capture device. According to such example embodiments, image datasets obtained in such manners may have already been encoded into a compressed format by a uniform codec, so as to facilitate subsequent steps of preprocessing and augmentation. These image datasets may be stored on various storage devices, such as non-volatile storage devices of computing devices according to example embodiments of the present disclosure, and computer-readable storage media in general as defined by the present disclosure.

At a step 102, compressed images of an image dataset are obtained and input into a decoder.

According to example embodiments of the present disclosure, the compressed images have already been transformed into a frequency domain representation by DCT, and have subsequently been encoded into a compressed format.

At a step 104, the decoder decodes the compressed images into a frequency domain representation of the image dataset.

Figure 1B:
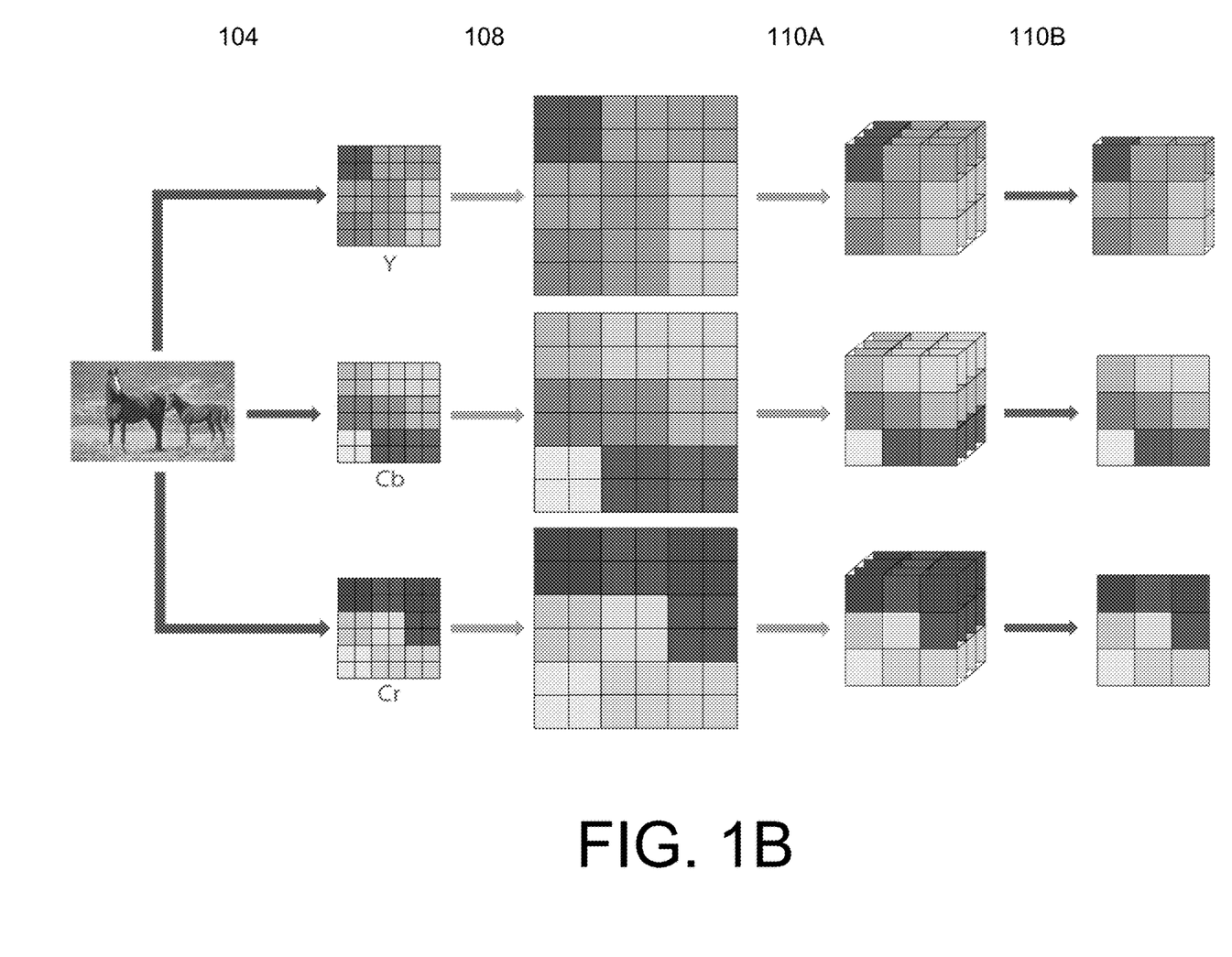
FIGS. 1B and 1C illustrate steps of the preprocessing process performed upon an example image.

For example, the decoder may apply entropy decoding and dequantization to the compressed images. However, the decoder does not apply IDCT to the compressed images to return the compressed images to spatial domain representations thereof. At this stage, decoded images in a frequency domain representation may be represented by DCT blocks (i.e., arrays of coefficients) and may have channel size n and dimensions height H and width W. Moreover, components of the image may be represented by separate DCT blocks. For example, according to implementation of the JPEG codec, prior to being transformed into a frequency-domain representation, images may be converted to representations thereof in the YCbCr color space, such that a luma component (Y) is separated from chroma components (Cb and Cr). Each of the luma component and the chroma components may be represented by a separate DCT block in the frequency domain. An example embodiment of this is illustrated in FIG. 1B.

At a step 106, an augmentation operation is performed on the image dataset in a frequency domain representation.

For conciseness, data augmentation operations are described in further detail below with reference to step 112. The augmented image dataset may be used for a training computation of a learning model. However, according to example embodiments of the present disclosure, a learning model may be assumed to require image datasets having uniform dimensions of height h and width w, and at this stage of the process 100, the augmented image dataset may not yet have these uniform dimensions across all images. Thus, according to example embodiments of the present disclosure, the augmented image dataset following step 106 may not yet be used for a training computation of a learning model. Alternatively, step 106 may be performed with only augmentation operations which do not affect dimensions of images of the image dataset. Alternatively, according to example embodiments of the present disclosure, step 106 may not be performed, and augmentation is instead performed after dimensions of the image dataset are modified by at least some of the subsequent preprocessing operations, such as described below with reference to step 112.

Augmentation of an image dataset may refer to any type of operation performed on data of the dataset images to generate additional images in the image dataset. For example, images may be resized, rotated, reshaped, cropped, rescaled in any or all color channels thereof, shifted by some number of pixels in any direction, altered in brightness or contrast, or flipped in any orientation, or may undergo other such operations as known to persons skilled in the art. Moreover, images may undergo operations only operative in frequency domain representations, such as having frequency jitter applied thereto. Thus, the image dataset following augmentation may contain some number of images derived from other images of the image dataset by any of the above-mentioned operations or combinations thereof, as well as any other suitable operations known to persons skilled in the art.

A training computation may generally be performed to train the learning model on a loss function to learn a feature embedding operative to compute one or more tasks. Tasks may include, for example, classification, clustering, matching, regression, and the like. The performance of such training computations is generally known to persons skilled in the art and need not be reiterated herein.

At a step 108, a resizing operation based on resizing factors is performed on the image dataset in a frequency domain representation.

According to example embodiments of the present disclosure, several preprocessing operations may be performed on the image dataset to result in each image of the image dataset having uniform dimensions of height h and width w smaller than the original height H and width W, as required by a learning model. One of these preprocessing operations may be a resizing operation as described herein. Another of these preprocessing operations may be a reshaping operation as described below with reference to step 110. Another of these preprocessing operations may be a cropping operation as described below with reference to step 114.

Images of the image dataset may be resized according to any known resizing algorithm applicable to image representations in the frequency domain, such as to DCT blocks. For example, a hybrid resizing algorithm ("HRA") may be applied. In general, a first DCT block of an image having dimensions of height H and width W may be resized to a second DCT block of the image having dimensions of height h=H×P/L and width w=W×Q/M. P/L and Q/M are the respective resizing factors for height and width of the image to be resized. P, Q, L, and M may each be an integer, and L and M may be predetermined values.

Since images are composed of DCT blocks, this may be accomplished by transforming each DCT block (i.e., an array of coefficients) from having dimensions $N_h \times N_w$ to having dimensions $K_h \times K_w$, where $N_h$ and $N_w$ are respectively the lengthwise and widthwise integer dimensions of the DCT blocks before the transformations and $K_h$ and $K_w$ are respectively the lengthwise and widthwise integer dimensions of the DCT blocks after the transformations. To be consistent with resizing factors of the overall image, the transformation should resample DCT blocks from having dimensions $LN_h \times MN_w$ to having dimensions $PN_h \times QN_w$, first padding the image on two adjacent sides or all four sides as necessary such that they are proportional to $LN_h \times MN_w$ (dimensions of known values).

Therefore, the DCT blocks are resampled by the resampling factors $r_h = H/(LN_h)$ heightwise and $r_w = W/(MN_w)$ widthwise, such that $r_h(LN_h)(P/L) = K_h$ and $r_w(MN_w)(Q/M) = K_w$. Thus, P is derived for an HRA computation as $P = K_h(N_h r_h)$ and $Q = K_w(N_w r_w)$.

Consequently, application of HRA to a first DCT block (n, H, W) having channel size n and dimensions height H and width W resizes the first DCT block to a second DCT block (n, H×P/L, W×Q/M) having channel size n and dimensions of height H×P/L and width W×Q/M. An example of this is illustrated in FIG. 1B.

At a step 110, a reshaping operation based on reshaping factors is performed on the image dataset in a frequency domain representation.

Since the images are represented in the frequency domain rather than the spatial domain, rather than preprocessing operations removing pixel information, preprocessing operations may not be readily applicable to frequency information if applied in a conventional manner to DCT blocks. For example, since the image may be composed of multiple DCT blocks each representing a component of the image (such as the Y, Cb, and Cr components), preprocessing each DCT block separately may fail to effectively preserve coherent image data. Thus, it is desirable to generate a single representation of an image while maintaining representation in the frequency domain.

Therefore, according to example embodiments of the present disclosure, to preprocess images represented in the frequency domain, images may be reshaped so that all image data of the same frequency in each component of the image is aggregated in a same channel. To accomplish this, a resized image (n, H×W×Q/M) may further be reshaped to a reshaped image (n×$N_h$×$N_w$, H×P/L/$N_h$, W×Q/M/$N_w$) having channel size n×$N_h$×$N_w$ and dimensions of height H×P/L/$N_h$ and width W×Q/M/$N_w$.

Consequently, the height and width of each image is reduced by respective reshaping factor while the size of each channel is proportionally increased in two dimensions by the same reshaping factors, resulting in a rank 2 tensor of $N_h$×$N_w$ matrices. An example of this is illustrated in FIG. 1B as step 110A. The rank 2 tensors are then reduced to a rank 1 tensor having the same number of channels but reduced dimensionality. The number of channels may be the same as the size of the DCT coefficients per block. An example of this is illustrated in FIG. 1B as step 110B.

Figure 1C:
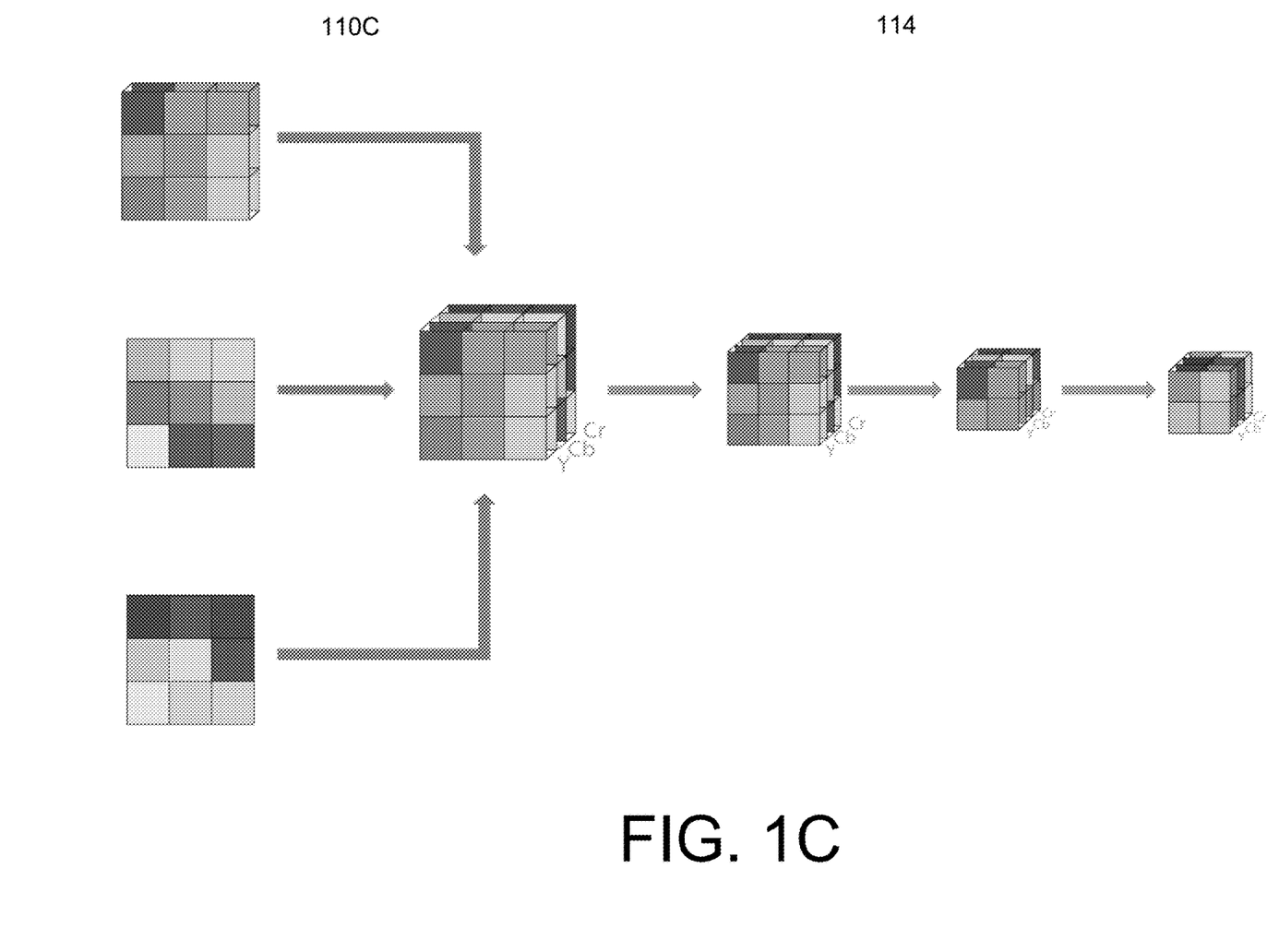

Next, the reduced-dimensionality tensors may be aggregated by frequency to produce an aggregated rank 2 tensor, each channel of the aggregated rank 2 tensor containing all image data of the same frequency. The number of channels of the aggregated tensor may be equal to the number of coefficients in the original DCT blocks. An example of this is illustrated in FIG. 1C as step 110C. This reshaping enables the subsequent cropping step 114 to be performed across frequency channels of the image consistently for each of the Y, Cb, and Cr components.

At a step 112, an augmentation operation is performed on the image dataset in a frequency domain representation.

Augmentation operations according to example embodiments of the present disclosure may be performed by reshaping an image representation in the frequency domain from a H×W image to a three-dimensional tensor of dimensions (H/N)×(W/N)×(N×N).

An augmentation operation according to example embodiments of the present disclosure may be a flip operation, which may be performed upon the tensor in a manner similar to that performed for image representations in the spatial domain, wherein values in the tensor may be mirrored across an axis to generate a new tensor of the same dimensions.

An augmentation operation according to example embodiments of the present disclosure may be a rotation operation, which may be performed upon the tensor in a manner similar to that performed for image representations in the spatial domain, wherein values in the tensor may be rotated into any suitable orientation to generate a new tensor of the same dimensions.

An augmentation operation according to example embodiments of the present disclosure may be a crop operation (at random locations, any number of times), which may be performed upon the tensor in a manner similar to that performed for image representations in the spatial domain, wherein values in the tensor may be cropped to any suitable subset to generate a new tensor of smaller dimensions.

An augmentation operation according to example embodiments of the present disclosure may be a noise injection operation, which may be performed upon the tensor in a manner similar to color jitter as performed for image representations in the spatial domain, wherein a random value is added to each value of the tensor to generate a new tensor of the same dimensions.

An augmentation operation according to example embodiments of the present disclosure may be a channel reweighting operation, which may be performed upon an image representation in the spatial domain by multiplying a coefficient of each channel by a weighing factor. A weighing factor may be scaled from 0 to 1, inclusive, or may be scaled from 0 to values larger than 1. Weighing factors may be determined for various purposes wherein certain resolutions of the image should be emphasized and/or deemphasized: for example, in the case that images of the image dataset are compressed in JPEG format, and a quality factor set for the JPEG encoder is known, frequencies emphasized and deemphasized in the compressed images may be determined based on the quality factor. Therefore, weighing factors may be set to weigh frequencies favored by the quality factor more highly than frequencies disfavored by the quality factor.

Other augmentation operations according to example embodiments of the present disclosure may be any operation on an image representation in the frequency domain, or a tensor thereof, which generates an arbitrary new image or tensor, respectively, derived from the original image or tensor data.

Presently, the augmented image dataset may be used for a training computation of a learning model.

At a step 114, a cropping operation is performed on the image dataset in a frequency domain representation.

Images of the image dataset, having undergone reshaping, may now be directly cropped to the dimensions h×w as required for input into the learning model. An example of this is illustrated in FIG. 1C. Prior to step 114, the image (represented as a tensor as described above) may be further resized as needed, such as during the augmentation step 112 or for the purpose of cropping step 114. After step 114, the image (represented as a cropped tensor) may be normalized as needed to be in accordance with dimensions of each other image of the image dataset processed in this manner. According to example embodiments of the present disclosure, the location of the crop may be determined as follows.

In the case that, during step 108, the image was padded on all four sides, the cropping operation may be a center crop performed on all four sides of the image.

In the case that, during step 108, the image was padded at a lower right portion, the cropping operation may be a corner crop performed on upper and left edges of the image.

At a step 116, the image dataset in a frequency domain representation is input into a learning model.

The image dataset may be input into a learning model to be utilized for training or inference computations, without the image dataset having undergone IDCT to be returned to a spatial domain representation. Machine learning inference computations as known to persons skilled in the art may be more efficiently performed having an image dataset in a frequency domain representation.

Figure 2A:
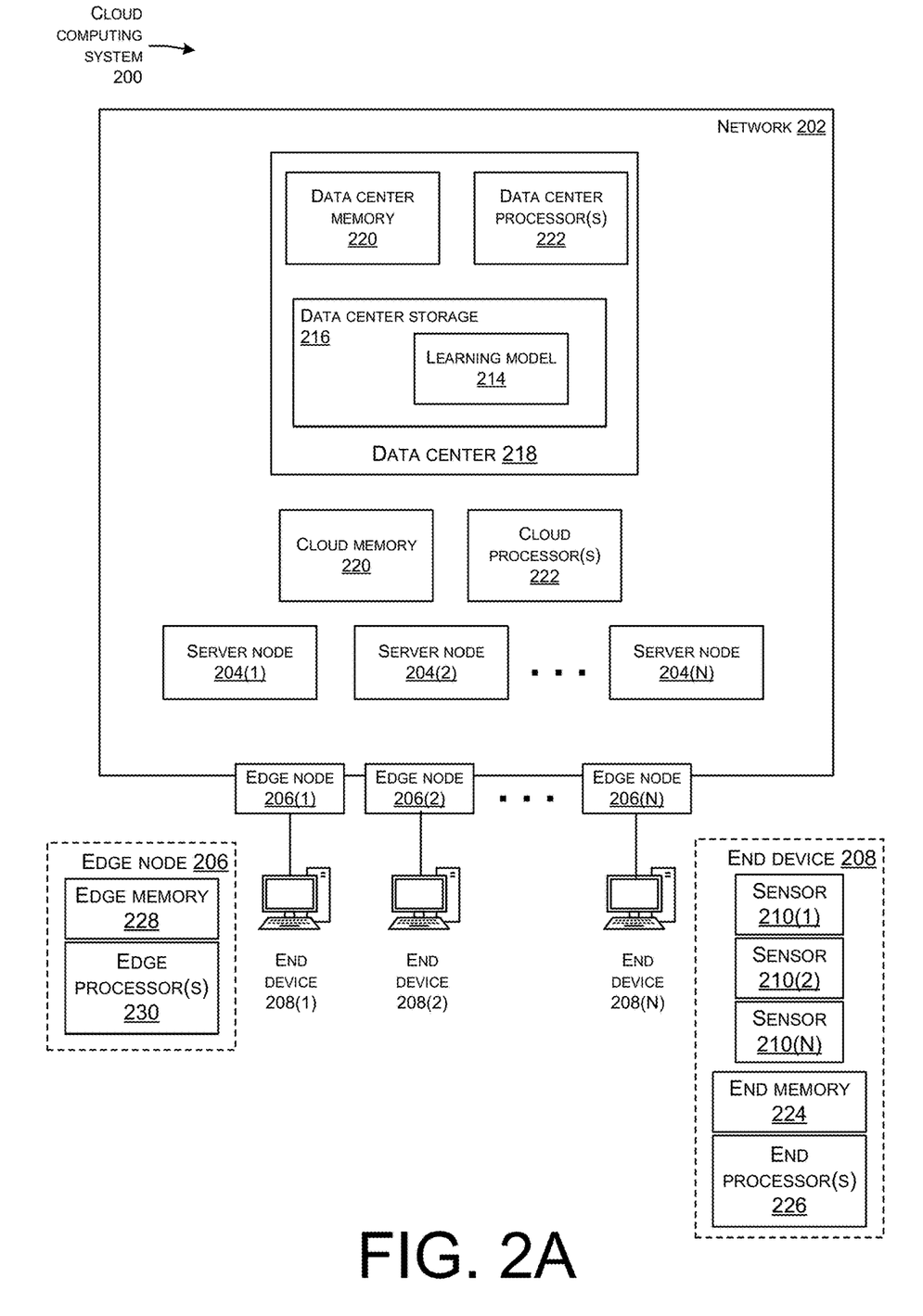
FIG. 2A illustrates an architectural diagram of a cloud computing system hosting a learning model according to example embodiments of the present disclosure.

FIG. 2A illustrates an architectural diagram of a cloud computing system 200 hosting a learning model according to example embodiments of the present disclosure. As described above, while examples of computing devices according to example embodiments of the present disclosure may be operative to perform subsequent training and inference computations using the image dataset, in other cases additional computing devices, in communication by network connections, may be operative to perform training and inference computations. Thus, this figure illustrates some possible architectural embodiments of computing devices as described above.

The cloud computing system 200 may be implemented over a network 202 of physical or virtual server nodes 204(1), 204(2), . . . , 204(N) (where any unspecified server node may be referred to as a server node 204) connected by physical or virtual network connections. Furthermore, the network 202 terminates at physical or virtual edge nodes 206(1), 206(2), . . . , 206(N) (where any unspecified edge node may be referred to as an edge node 206) located at physical and/or logical edges of the network 202. The edge nodes 206(1) to 206(N) may connect to any number of end devices 208(1), 208(2), . . . , 208(N) (where any unspecified end device may be referred to as an end device 208). An end device 208, such as, by way of example, end device 208(1), may collect captured data from any number of sensors 210(1), 210(2), . . . , 210(N), where a sensor may be, for example, an image capture device operative to collect image data (such as still images, video frames, and the like).

Figure 2B:
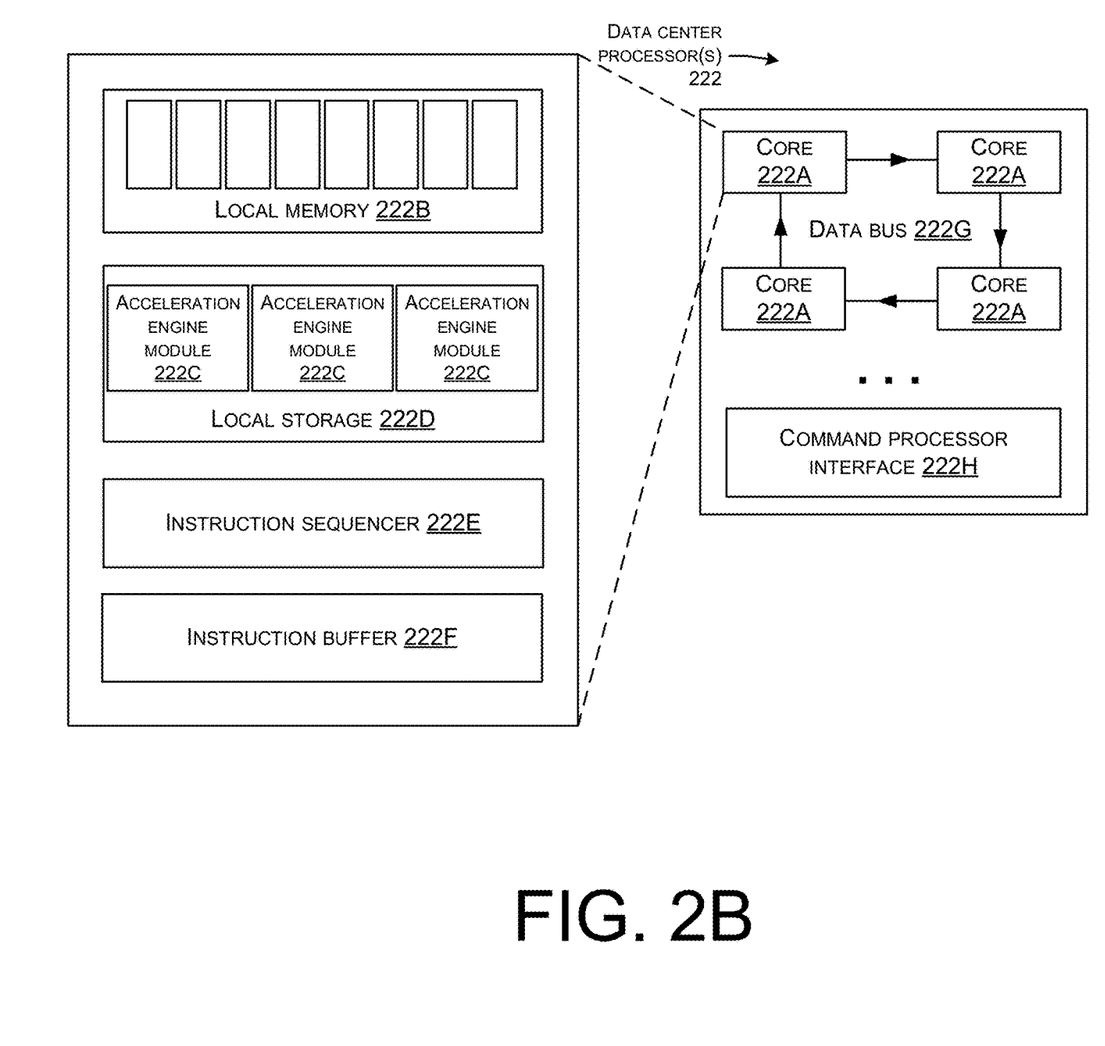
FIG. 2B illustrates data center processor(s) according to examples of FIG. 2A.

A learning model 214 implemented on the cloud computing system 200 may be stored on physical or virtual storage 216 of a data center 218 ("data center storage") implemented in the cloud computing system 200, and may be loaded into physical or virtual memory 220 of the data center 218 ("data center memory") in order for one or more physical or virtual processor(s) 222 of the data center 218 ("data center processor(s)") to perform training and/or inference computations using the learning model 214 to compute input datasets related to neural network computing tasks. Data center processor(s) 222 may be special-purpose computing devices facilitating computation of neural network computing tasks. For example, processor(s) 222 may be accelerator(s), such as Neural Network Processing Units ("NPUs"), Graphics Processing Units ("GPUs"), Tensor Processing Units ("TPU"), and the like. FIG. 2B illustrates an example of processor(s) 222, including any number of core(s) 222A. Processing power of the processor(s) 222 may be distributed among the core(s) 222A. Each core 222A may include local memory 222B, which may contain pre-initialized data, such as model weights, or data structures, such as constant buffers for batch normalization or quantization, for the performance of special-purpose computing. Each core 222A may further be configured to execute one or more sets of computer-executable acceleration engine modules 222C pre-initialized on local storage 222D of the core 222A, which may each be executable by the core(s) 222A, including execution in parallel by multiple core(s) 222A, to perform or accelerate, for example, arithmetic operations such as matrix multiplication or matrix transposition, function operations such as convolution, specially defined operations such as pooling of convolutional layers, interpolation, or region-of-interest operations, data operations. Each core 222A may further include an instruction sequencer 222E, which receives and orders instructions received from an instruction buffer 222F. Some number of core(s) 222A, such as four, may be in communication by a data bus 222G, such as a unidirectional ring bus. Software drivers controlling operation of each core 222A may control the core(s) 222A and synchronize their operations by sending executable commands through a command processor interface 222H.

According to example embodiments of the present disclosure, a computing device as described above may be any of the server nodes 204, any of the edge nodes 206, or any of the end devices 208, and image datasets captured at an end device 208 may be loaded into physical or virtual memory 224 of the end devices 208 ("end memory") in order for one or more physical or virtual processor(s) 226 ("end processor(s)") of the end devices 208 to perform encoding, preprocessing and/or augmentation operations as described above. Alternatively, image datasets captured at an end device 208 may be transported to any of the edge nodes 206 and loaded into physical or virtual memory 228 of the edge nodes 206 ("edge memory") in order for one or more physical or virtual processor(s) 230 ("edge processor(s)") of the edge nodes 206 to perform encoding, preprocessing and/or augmentation operations as described above. Alternatively, image datasets captured at an end device 208 may be transported to any of the server nodes 204 and loaded into physical or virtual memory 220 of the cloud computing system 200 in order for one or more physical or virtual processor(s) 220 of the cloud computing system 200 to perform encoding, preprocessing and/or augmentation operations as described above. Alternatively, rather than being captured, image datasets may originate from one or more precompiled image datasets, and to not need to be compressed as long as they are compressed in a uniform format. In general, if images of image datasets are captured and compressed according to example embodiments of the present disclosure, they may be compressed at any of the end devices 208 rather than other devices, so as to minimize data transported.

Image datasets that have been preprocessed and/or augmented according to embodiments of the present disclosure may be transported to one or more server nodes 204 and utilized by the cloud computing network 200 to perform training and/or inference computations based on the learning model 214. Generally, training and inference computations may be intensive in consumption of computational resources. Thus, it is desirable to reduce computation where possible, by, for example, bypassing a first layer of a learning model when inputting image datasets as described above with reference to FIGS. 1A-1C, by avoiding the redundant operations of transforming decoded image data into a spatial domain representation prior to input into the learning model subsequent to input into the learning model. By performing preprocessing and augmentation operations in the frequency domain and then inputting the preprocessed and augmented image dataset into a learning model without the decoder performing IDCT on the image dataset, example embodiments of the present disclosure may accomplish such objectives.

Figure 3:
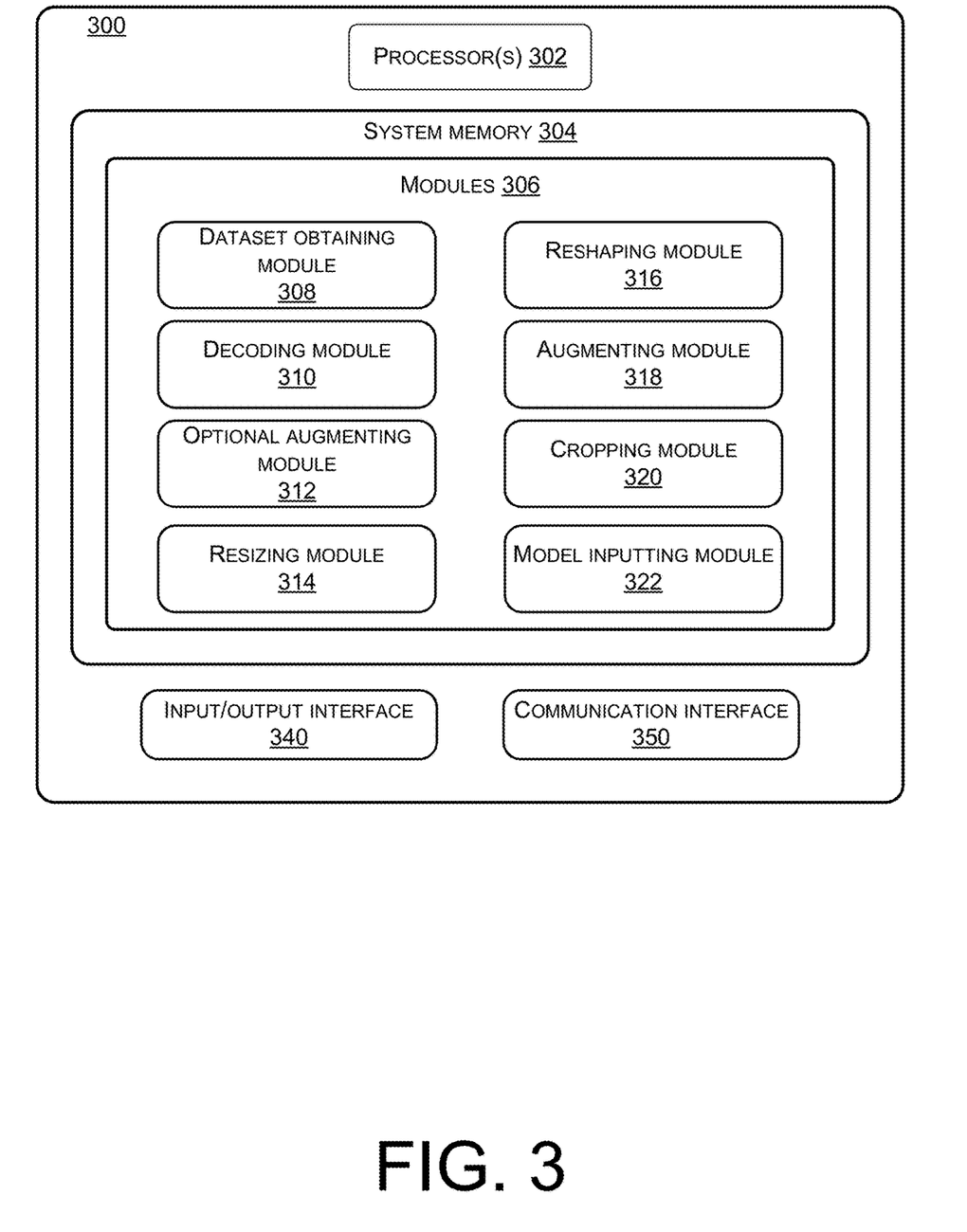
FIG. 3 illustrates an example system for implementing the processes and methods described herein for implementing data processing and data augmentation for learning models.

FIG. 3 illustrates an example system 300 for implementing the processes and methods described above for implementing data processing and data augmentation in the frequency domain for learning models.

The techniques and mechanisms described herein may be implemented by multiple instances of the system 300, as well as by any other computing device, system, and/or environment. The system 300 may be a distributed system composed of multiple physically networked computers or web servers, a physical or virtual cluster, a computing cloud, or other networked computing architectures providing physical or virtual computing resources as known by persons skilled in the art. Examples thereof include learning systems such as the cloud computing system as described above with reference to FIG. 2A. The system 300 shown in FIG. 3 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 300 may include one or more processors 302 and system memory 304 communicatively coupled to the processor(s) 302. The processor(s) 302 and system memory 304 may be physical or may be virtualized and/or distributed. The processor(s) 302 may execute one or more modules and/or processes to cause the processor(s) 302 to perform a variety of functions. In embodiments, the processor(s) 302 may include a central processing unit ("CPU"), a GPU, an NPU, a TPU, any combinations thereof, or other processing units or components known in the art. Additionally, each of the processor(s) 302 may possess its own local memory, which also may store program modules, program data, and/or one or more operating systems.

Depending on the exact configuration and type of the system 300, the system memory 304 may be volatile, such as RAM, non-volatile, such as ROM, flash memory, miniature hard drive, memory card, and the like, or some combination thereof. The system memory 304 may include one or more computer-executable modules 306 that are executable by the processor(s) 302. The modules 306 may be hosted on a network as services for a data processing platform, which may be implemented on a separate system from the system 300.

The modules 306 may include, but are not limited to, a dataset obtaining module 308, a decoding module 310, an optional augmenting module 312, a resizing module 314, a reshaping module 316, an augmenting module 318, a cropping module 320, and a model inputting module 322.

The dataset obtaining module 308 may be configured to obtain compressed images of an image dataset and input the images into a decoder as described above with reference to FIGS. 1A-1C.

The decoding module 310 may be configured to decode the compressed images into a frequency domain representation of the image dataset as described above with reference to FIGS. 1A-1C.

The optional augmenting module 312 may be configured to perform an augmentation operation on the image dataset in a frequency domain representation before subsequently described modules perform preprocessing operations, as described above optionally with reference to FIGS. 1A-1C.

The resizing module 314 may be configured to perform a resizing operation based on resizing factors on the image dataset in a frequency domain representation as described above with reference to FIGS. 1A-1C.

The reshaping module 316 may be configured to perform a reshaping operation based on reshaping factors is performed on the image dataset in a frequency domain representation, as described above with reference to FIGS. 1A-1C.

The augmenting module 318 may be configured to perform an augmentation operation on the image dataset in a frequency domain representation before subsequently described modules perform preprocessing operations, as described above optionally with reference to FIGS. 1A-1C.

The cropping module 320 may be configured to perform a cropping operation on the image dataset in a frequency domain representation, as described above with reference to FIGS. 1A-1C.

The model inputting module 322 may be configured to input the image dataset in a frequency domain representation into a learning model, as described above with reference to FIGS. 1A-1C.

The system 300 may additionally include an input/output ("I/O") interface 340 and a communication module 350 allowing the system 300 to communicate with other systems and devices over a network. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RANI"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides preprocessing operations and augmentation operations upon image datasets transformed to frequency domain representations, so that image datasets may be preprocessed and augmented and then input into a learning model for training and inference all in the frequency domain. For example, image datasets that are captured as raw images and compressed by a uniform codec in the frequency domain may benefit from these operations, since leaving the images in frequency domain representations after transformation for encoding may enable the images to be directly input into learning model layers that perform frequency domain computations. The preprocessing and augmentation operations described herein are tailored to frequency domain representations of images, including some behavior which is different from spatial domain preprocessing and augmentation operations. Normal decoder behavior of returning the image dataset to a spatial domain representation by an inverse transformation is skipped. Since computations based on image datasets are often performed in the frequency domain, the already computation-intensive training and inference computations of learning models such as neural networks may be freed from additional computational overhead caused by transforming image datasets into frequency domain representations a second time. Furthermore, computational overhead caused by inverse transformation operations is also alleviated.

Example Clauses

A. A method comprising: decoding images of an image dataset to generate a frequency domain representation of the image dataset; performing a resizing operation based on resizing factors on the image dataset in a frequency domain representation; performing a reshaping operation based on reshaping factors on the image dataset in a frequency domain representation; and performing a cropping operation on the image dataset in a frequency domain representation.

B. The method as paragraph A recites, wherein the images of the image dataset are transformed from a raw image format into a frequency domain representation and are encoded into a compressed format before the images are decoded.

C. The method as paragraph B recites, wherein an inverse transformation from a frequency domain representation to a spatial domain representation is not performed on images of the image dataset.

D. The method as paragraph A recites, wherein no augmentation operations are performed on the image dataset in a frequency domain representation before performing the resizing operation on the image dataset.

E. The method as paragraph A recites, further comprising performing an augmentation operation on the image dataset in a frequency domain representation before performing the resizing operation on the image dataset.

F. The method as paragraph A recites, wherein the resizing factors comprise a lengthwise resizing factor and a widthwise resizing factor.

G. The method as paragraph A recites, wherein the resizing operation further comprises padding the images each on two adjacent sides in proportion to the resizing factors or padding the image each on four sides in proportion to the resizing factors.

H. The method as paragraph A recites, wherein the reshaping operation comprises reshaping the images each by dividing an image length and an image width by the reshaping factors and multiplying image channel size by the reshaping factors.

I. The method as paragraph A recites, further comprising performing an augmentation operation on the image dataset in a frequency domain representation.

J. The method as paragraph I recites, wherein performing the augmentation operation comprises reshaping images of the image dataset to tensor representations thereof, and performing an augmentation operation on the tensor representations.

K. The method as paragraph I recites, wherein the augmentation operation is performed upon coefficients of images of the image dataset in a frequency domain representation.

L. The method as paragraph A recites, wherein the cropping operation is performed on four sides of images of the image dataset in a frequency domain representation.

M. The method as paragraph A recites, wherein the cropping operation is performed on an upper edge and a left edge of images of the image dataset in a frequency domain representation.

N. The method as paragraph A recites, wherein the image dataset in a frequency domain representation is input into a learning model for training computations after an augmentation operation is performed on the image dataset.

O. The method as paragraph A recites, wherein the image dataset in a frequency domain representation is input into a learning model for inference computations after a cropping operation is performed on the image dataset.

P. The method as paragraph O recites, wherein the image dataset is input into a learning model bypassing a first layer of the learning model.

Q. A system comprising: one or more processors; and memory communicatively coupled to the one or more processors, the memory storing computer-executable modules executable by the one or more processors that, when executed by the one or more processors, perform associated operations, the computer-executable modules comprising: a decoding module configured to decode images of an image dataset to generate a frequency domain representation of the image dataset, a resizing module configured to perform a resizing operation based on resizing factors on the image dataset in a frequency domain representation, a reshaping module configured to perform a reshaping operation based on reshaping factors on the image dataset in a frequency domain representation, and a cropping module configured to perform a cropping operation on the image dataset in a frequency domain representation.

R. The system as paragraph Q recites, wherein the images of the image dataset are transformed from a raw image format into a frequency domain representation and are encoded into a compressed format before the images are decoded.

S. The system as paragraph R recites, wherein the decoding module is configured to not perform an inverse transformation from a frequency domain representation to a spatial domain representation on images of the image dataset.

T. The system as paragraph Q recites, wherein the augmenting module is configured to not perform an augmentation operation on the image dataset in a frequency domain representation before the resizing module performs the resizing operation on the image dataset.

U. The system as paragraph Q recites, further comprising an optional augmenting module configured to perform an augmentation operation on the image dataset in a frequency domain representation before the resizing module performs the resizing operation on the image dataset.

V. The system as paragraph Q recites, wherein the resizing factors comprise a lengthwise resizing factor and a widthwise resizing factor.

W. The system as paragraph Q recites, wherein the resizing module is further configured to pad the images each on two adjacent sides in proportion to the resizing factors or each on four sides in proportion to the resizing factors.

X. The system as paragraph Q recites, wherein the reshaping module is configured to reshape the images each by dividing an image length and an image width by the reshaping factors and multiplying image channel size by the reshaping factors.

Y. The system as paragraph Q recites, further comprising an augmenting module configured to perform an augmentation operation on the image dataset in a frequency domain representation.

Z. The system as paragraph Y recites, wherein the augmenting module is configured to reshape images of the image dataset to tensor representations thereof, and perform an augmentation operation on the tensor representations.

AA. The system as paragraph Y recites, wherein the augmenting module is configured to perform an augmentation operation upon coefficients of images of the image dataset in a frequency domain representation.

BB. The system as paragraph Q recites, wherein the cropping module is configured to perform a cropping operation on four sides of images of the image dataset in a frequency domain representation.

CC. The system as paragraph Q recites, wherein the cropping module is configured to perform a cropping operation on an upper edge and a left edge of images of the image dataset in a frequency domain representation.

DD. The system as paragraph Q recites, further comprising a model inputting module configured to input the image dataset in a frequency domain representation into a learning model for training computations after the augmenting module performs an augmentation operation on the image dataset.

EE. The system as paragraph Q recites, further comprising a model inputting module configured to input the image dataset in a frequency domain representation into a learning model for inference computations after the cropping module performs a cropping operation on the image dataset.

FF. The system as paragraph EE recites, wherein the model inputting module is further configured to input the image dataset into a learning model bypassing a first layer of the learning model.

GG. A computer-readable storage medium storing computer-readable instructions executable by one or more processors, that when executed by the one or more processors, cause the one or more processors to perform operations comprising: decoding images of an image dataset to generate a frequency domain representation of the image dataset; performing a resizing operation based on resizing factors on the image dataset in a frequency domain representation; performing a reshaping operation based on reshaping factors on the image dataset in a frequency domain representation; and performing a cropping operation on the image dataset in a frequency domain representation.

HH. The computer-readable storage medium as paragraph GG recites, wherein the images of the image dataset are transformed from a raw image format into a frequency domain representation and are encoded into a compressed format before the images are decoded.

II. The computer-readable storage medium as paragraph GG recites, wherein an inverse transformation from a frequency domain representation to a spatial domain representation is not performed on images of the image dataset.

JJ. The computer-readable storage medium as paragraph GG recites, wherein no augmentation operations are performed on the image dataset in a frequency domain representation before performing the resizing operation on the image dataset.

KK. The computer-readable storage medium as paragraph GG recites, wherein the operations further comprise performing an augmentation operation on the image dataset in a frequency domain representation before performing the resizing operation on the image dataset.

LL. The computer-readable storage medium as paragraph GG recites, wherein the resizing factors comprise a lengthwise resizing factor and a widthwise resizing factor.

MM. The computer-readable storage medium as paragraph GG recites, wherein the resizing operation further comprises padding the images each on two adjacent sides in proportion to the resizing factors or each on four adjacent sides in proportion to the resizing factors.

NN. The computer-readable storage medium as paragraph GG recites, wherein the reshaping operation comprises reshaping the images each by dividing an image length and an image width by the reshaping factors and multiplying image channel size by the reshaping factors.

OO. The computer-readable storage medium as paragraph GG recites, further comprising performing an augmentation operation on the image dataset in a frequency domain representation.

PP. The computer-readable storage medium as paragraph OO recites, wherein performing the augmentation operation comprises reshaping images of the image dataset to tensor representations thereof, and performing an augmentation operation on the tensor representations.

QQ. The computer-readable storage medium as paragraph OO recites, wherein the augmentation operation is performed upon coefficients of images of the image dataset in a frequency domain representation.

RR. The computer-readable storage medium as paragraph GG recites, wherein the cropping operation is performed on four sides of images of the image dataset in a frequency domain representation.

SS. The computer-readable storage medium as paragraph GG recites, wherein the cropping operation is performed on an upper edge and a left edge of images of the image dataset in a frequency domain representation.

TT. The computer-readable storage medium as paragraph GG recites, wherein the operations further comprise inputting the image dataset in a frequency domain representation into a learning model for training computations after an augmentation operation is performed on the image dataset.

UU. The computer-readable storage medium as paragraph GG recites, wherein the operations further comprise inputting the image dataset in a frequency domain representation into a learning model for inference computations after a cropping operation is performed on the image dataset.

VV. The computer-readable storage medium as paragraph UU recites, wherein the model inputting module is further configured to input the image dataset into a learning model bypassing a first layer of the learning model.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    decoding images of an image dataset to generate a frequency domain representation of the image dataset;
    performing a resizing operation based on resizing factors on the image dataset in a frequency domain representation;
    performing a reshaping operation based on reshaping factors on the image dataset in a frequency domain representation; and
    performing a cropping operation on the image dataset in a frequency domain representation.

2. The method of claim 1, wherein the resizing operation further comprises padding the images each on two adjacent sides in proportion to the resizing factors or each on four sides in proportion to the resizing factors.

3. The method of claim 1, wherein the reshaping module is configured to reshape the images each by dividing an image length and an image width by the reshaping factors and multiplying image channel size by the reshaping factors.

4. The method of claim 1, further comprising performing an augmentation operation on the image dataset in a frequency domain representation.

5. The method of claim 4, wherein the augmentation operation is performed upon coefficients of images of the image dataset in a frequency domain representation.

6. The method of claim 1, wherein the cropping operation is performed on an upper edge and a left edge of images of the image dataset in a frequency domain representation.

7. The method of claim 1, wherein the cropping operation is performed on four sides of images of the image dataset in a frequency domain representation.

8. A system comprising:
    one or more processors; and
    memory communicatively coupled to the one or more processors, the memory storing computer-executable modules executable by the one or more processors that, when executed by the one or more processors, perform associated operations, the computer-executable modules comprising:
        a decoding module configured to decode images of an image dataset to generate a frequency domain representation of the image dataset;
        a resizing module configured to perform a resizing operation based on resizing factors on the image dataset in a frequency domain representation;
        a reshaping module configured to perform a reshaping operation based on reshaping factors on the image dataset in a frequency domain representation; and
        a cropping module configured to perform a cropping operation on the image dataset in a frequency domain representation.

9. The system of claim 8, wherein the resizing module is further configured to pad the images each on two adjacent sides in proportion to the resizing factors or each on four sides in proportion to the resizing factors.

10. The system of claim 8, wherein the reshaping module is configured to reshape the images each by dividing an image length and an image width by the reshaping factors and multiplying image channel size by the reshaping factors.

11. The system of claim 8, further comprising an augmenting module configured to perform an augmentation operation on the image dataset in a frequency domain representation.

12. The system of claim 11, wherein the augmenting module is configured to perform an augmentation operation upon coefficients of images of the image dataset in a frequency domain representation.

13. The system of claim 8, wherein the cropping module is configured to perform a cropping operation on an upper edge and a left edge of images of the image dataset in a frequency domain representation.

14. The system of claim 8, wherein the cropping module is configured to perform a cropping operation on four sides of images of the image dataset in a frequency domain representation.

15. A computer-readable storage medium storing computer-readable instructions executable by one or more processors, that when executed by the one or more processors, cause the one or more processors to perform operations comprising:
    decoding images of an image dataset to generate a frequency domain representation of the image dataset;
    performing a resizing operation based on resizing factors on the image dataset in a frequency domain representation;
performing a reshaping operation based on reshaping factors on the image dataset in a frequency domain representation; and
    performing a cropping operation on the image dataset in a frequency domain representation.

16. The computer-readable storage medium of claim 15, wherein the resizing operation further comprises padding the images each on two adjacent sides in proportion to the resizing factors or padding the images each on four sides in proportion to the resizing factors.

17. The computer-readable storage medium of claim 15, wherein the reshaping operation comprises reshaping the images each by dividing an image length and an image width by the reshaping factors and multiplying image channel size by the reshaping factors.

18. The computer-readable storage medium of claim 17, further comprising performing an augmentation operation on the image dataset in a frequency domain representation.

19. The computer-readable storage medium of claim 15, wherein the cropping operation is performed on an upper edge and a left edge of images of the image dataset in a frequency domain representation.

20. The computer-readable storage medium of claim 15, wherein the cropping operation is performed on four sides of images of the image dataset in a frequency domain representation.

* * * * *